No. 625,221. Patented May 16, 1899.
F. VAN DEN BOSCH.
MOLD FOR PISTON PACKING.
(Application filed Feb. 7, 1899.)
(No Model.)
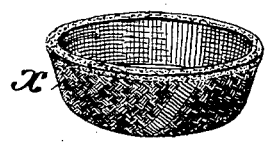
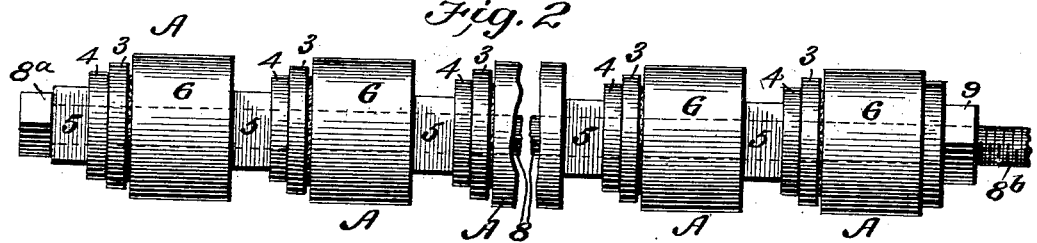
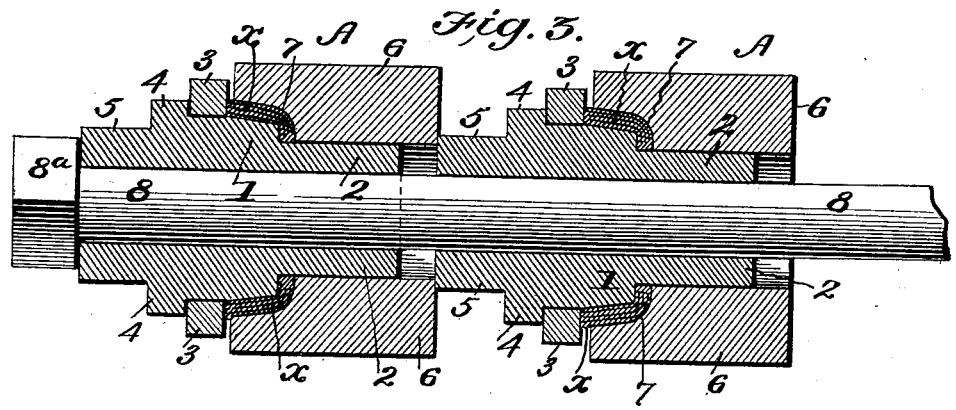
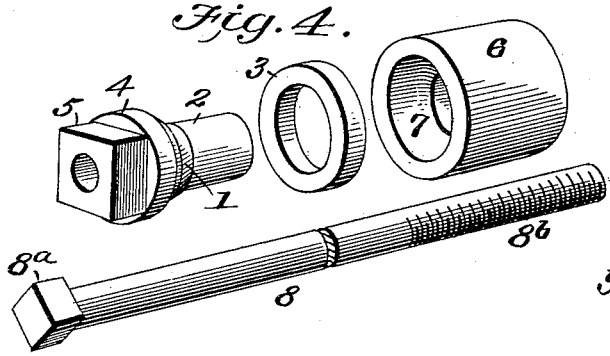
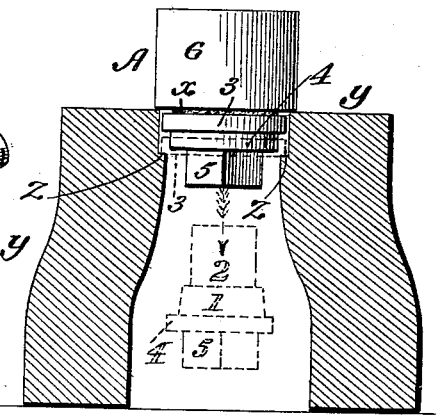
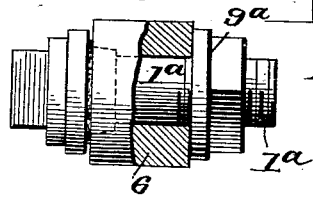
WITNESSES:
M. D. Bloudel
Amos W. Hart
INVENTOR
Frederick Van den Bosch.
BY Munn & Co.
ATTORNEYS.

UNITED STATES PATENT OFFICE.

FREDERICK VAN DEN BOSCH, OF PARKER'S LANDING, PENNSYLVANIA, ASSIGNOR TO EMMA VAN DEN BOSCH, OF SAME PLACE.

MOLD FOR PISTON-PACKING.

SPECIFICATION forming part of Letters Patent No. 625,221, dated May 16, 1899.

Application filed February 7, 1899. Serial No. 704,836. (No model.)

*To all whom it may concern:*

Be it known that I, FREDERICK VAN DEN BOSCH, of Parker's Landing, in the county of Armstrong and State of Pennsylvania, have invented certain new and useful Improvements in Molds for Piston-Packing, of which the following is a specification.

I have received Letters Patent No. 612,687, dated October 18, 1898, for an improved piston-cup or packing-ring composed in part of vulcanizable material, the said cup or ring being particularly adapted for such pistons as are commonly used in oil or other deep wells and therefore subjected to great strain and wear.

My present invention is an improved mold or molding apparatus for use in shaping and vulcanizing such piston cups or rings.

The said invention comprises improvements in the mold proper and in the means for temporarily clamping its detachable parts together, as required for imparting the required shape to the cup or ring and holding the same duly confined while being vulcanized.

In the accompanying drawings, Figure 1 is a perspective view of a piston ring or cup. Fig. 2 is a side view of a series of molds clamped together by means common to all. Fig. 3 is an enlarged longitudinal section of two of said molds arranged on the common clamping-rod. Fig. 4 is a perspective view of the several parts of the mold apparatus detached from each other. Fig. 5 is a partly-sectional view illustrating the means for and manner of separating the parts of the mold from each other subsequent to vulcanization. Fig. 6 is a side view, partly in section, of a modified form of mold.

The piston-cup or packing-ring $x$ (shown in Fig. 1) has the form and construction of that covered by my aforesaid patent, the same being composed of fibrous material and rubber united and arranged in a peculiar and advantageous manner. I do not, however, restrict my present invention to this particular form or composition of packing-ring, but propose to apply it to any other for which it may be suited.

As shown best in Figs. 3 and 4, each separate mold A comprises a tubular core, a base-ring, and a cup or mold proper. The core has an enlarged tapered base portion 1 and a cylindrical body 2. A detachable ring 3 encircles the base 1 and rests upon a radial flange or shoulder 4. The lower end or base proper, 5, of the core is made square or quadrangular and is of less diameter than the ring 3, for a purpose hereinafter stated. The cup or mold proper, 6, is of greater diameter than the ring 3, for a purpose also hereinafter explained. It is provided in its base or lower end with a conical cavity 7, (see Fig. 4,) adapted to duly shape the cup or packing-ring $x$ exteriorly, while the interior shape of the same is imparted by the tapered and shouldered base 1 of the core. The arrangement of such packing $x$ between the separable parts of the mold is shown in Fig. 3, the outer or free edge of the same abutting the detachable base-ring 3. The purpose and function of this ring will be presently explained.

The cylindrical portion 2 of the core fits with due accuracy in the longitudinal bore of the cup 6, but does not reach the top of the same.

Packing material $x$ having been arranged in a series of such complete molds, as shown in Fig. 2, the said molds are then arranged upon a common holder and clamp, comprising a headed rod 8 and nut 9—that is to say, a rod 8, having at one end an enlarged head $8^a$ and screw-threaded at the other, $8^b$, (see Fig. 2,) is passed through a series of molds A, as shown in Figs. 2 and 3, and the nut 9 is then applied to the threaded end $8^b$, Fig. 2, and turned up to clamp the whole series of molds A one against another. Thus the base 5 of a mold-core bears against the cup or head 6 of the adjacent mold, so that pressure applied to one part extends equally to all the rest of the series.

It will be seen that the rod 8 is virtually an extension or prolongation of the individual cores of the several molds. The series of molds A thus connected—say twenty in number—are placed in the baking-oven, (not shown,) being for this purpose manipulated as one integral apparatus. The advantageous result in economy of time and labor is apparent.

When the mold apparatus has been removed from the oven, the nut 9 is removed from the rod 8 and the several molds A are slid off from said rod, as will be readily understood.

There is considerable adhesion and friction between the core and cup of the several molds, and for the purpose of effecting their easy and speedy detachment, as well as release of the molded cup or packing $x$ therefrom, I employ the device $y$. (Shown in Fig. 5.) The same consists of any suitable form, preferably of metal, having a vertical bore adapted to allow the mold-core to pass through it, but having less diameter than the cup, and at one point also less diameter than the ring 3—that is to say, it is provided with a shoulder $z$, which is of less diameter than the mold-ring 3. It will now be understood that when a mold A is placed on the form $y$, as shown in Fig. 5, the cup 6 will rest upon the top thereof and the ring 3 be slightly above the shoulder $z$, since the cup exceeds the opening in the form. Then by driving down upon the core with a hammer and suitable tool all the parts save the cup 6 will be forced downward, the cup remaining fixed in position, and, next, the ring 3 striking upon the shoulder $z$ and the blows continued, the core will be separated from the said ring and also from the packing $x$, which remains supported upon the ring 3. Thus the latter serves its purpose in the first instance in the mold proper and then in the subsequent operation of forcing the packing $x$ from the core.

I show in Fig. 6 a modification of the screw-clamp, which is applicable to a single mold only. In this case the cylindrical body $1^a$ of the core is extended and screw-threaded, and a nut $9^a$ is applied to same for clamping the core and cup together, as will be readily understood. Thus the nut is applied in this case, as in the former one, to a core extension, and the clamping action is the same as in the case of the molds A and rod 8, before described.

The separation of the parts is effected in the same manner and by the same means as before described in connection with the molds A.

What I claim is—

1. A vulcanizing-mold comprising a core, a cup having a central longitudinal bore to receive the same, and means for clamping the core and cup together, substantially as shown and described.

2. A mold for the purpose specified, comprising a core having an enlarged base and cylindrical body, a cup having a cavity and central longitudinal bore, whereby it is adapted to surround the base and secure the body of said core, and a nut applied to a threaded core extension, substantially as shown and described.

3. The combination with a mold proper, composed of a separable core and cup adapted to fit upon the same, of a detachable base-ring adapted to fit between the cup and base of the core, substantially as shown and described.

4. The mold comprising the mold proper, consisting of a core and removable cup, a detachable base-ring adapted to fit upon said core and having less diameter than the cup, but greater diameter than the integral base of the core, substantially as shown and described, for the purpose specified.

5. The combination with a series of molds having a core and cup provided with central longitudinal coincident bores, and a holder and clamp which is common to the several molds, the same consisting of a rod and a clamping device proper, applied substantially as shown and described.

6. The combination with a series of molds for the purpose specified, the same having separable parts provided with coincident bores, of the rod adapted to pass through said bores, and having an enlarged head at one end and a screw-thread formed on the end, and a nut applied to the latter, as and for the purpose specified.

FRED. VAN DEN BOSCH.

Witnesses:
SAMUEL CRAIG,
O. TINSMAN.